United States Patent [19]

Wippler

[11] 4,116,862
[45] Sep. 26, 1978

[54] NEW PHOTOCHROMIC MATERIALS AND METHOD FOR THEIR PREPARATION

[75] Inventor: Constant Wippler, Illkirch Graffenstaden, France

[73] Assignee: Essilor International (Compagnie Generale d'Optique), Joinville-le-Pont, France

[21] Appl. No.: 791,638

[22] Filed: Apr. 27, 1977

[30] Foreign Application Priority Data

Apr. 30, 1976 [FR] France .................. 76 12962

[51] Int. Cl.$^2$ ............................. G03C 1/733
[52] U.S. Cl. ........................ 252/300; 350/354
[58] Field of Search .............. 252/300; 350/160 P

[56] References Cited

U.S. PATENT DOCUMENTS 3,530,075  9/1970  Wiebe .................. 252/300

FOREIGN PATENT DOCUMENTS 7,142,774  12/1971  Japan.

OTHER PUBLICATIONS

Chem. Abstracts, 82:73605d (1975).

Primary Examiner—Benjamin R. Padgett
Assistant Examiner—Deborah L. Kyle
Attorney, Agent, or Firm—Henry R. Lerner

[57] ABSTRACT

A photochromic material comprising a transparent polymer material having a block copolymer base with a structure wherein blocks of a first polymer form a dispersed phase in a matrix phase essentially composed of blocks of a second polymer, and an organic photochromic substance uniformly distributed in said polymer material.

18 Claims, No Drawings

NEW PHOTOCHROMIC MATERIALS AND METHOD FOR THEIR PREPARATION

The invention relates to photochromic materials, and more particularly to photochromic materials of organic nature, essentially made of plastics.

Photochromism is a well known phenomenon, according to which a material changes in color or opacity, in a reversible manner, when it is exposed to a determined irradiation. Such a phenomenon is used in several fields of the industry. One of its applications, which is likely to lead to particularly important developments, concerns the manufacture of transparent panes and protecting glasses presenting light transmission properties which vary as a function of their illumination. Such materials, which may become absorbant in a reversible manner under the effect of a light of high intensity, are more particularly intended to be used in the manufacture of panes for the building industry or the motor car industry or in the manufacture of sun glasses.

The only photochromic materials used in practice up to now are made of glass materials inside which photochromic substances of inorganic origin are incorporated. However, organic substances are known which have photochromic properties. They even have the advantage over inorganic substances of a greater sensibility, or optical density, and of a higher rate or speed of coloration and discoloration. But it has never been possible yet to make use of these advantages in the manufacture of materials suitable for industrial use.

Thus, although the incorporation of photochromic organic substances in transparent plastics, or organic transparent materials, has already been contemplated, one then came against various problems involving the inoperativeness of said substances and the prohibition, in practice, of any industrial carrying out. Searches made up to now have led to insist upon compatibility deficiencies between the photochromic substance and the resin into which it is incorporated, disturbance of the coloration and discoloration processes, particularly of their kinetics, significant lowering of the mechanical properties of the material obtained with respect to the properties of the base plastic composition, poor resistance to ageing under permanent illumination.

The techniques which involve simply physically mixing the resin with the photochromic substance have proved quite insufficient. The problems of compatibility are particularly acute. A solution that consists in directly forming the material by the polymerization of a photochromic monomer, as disclosed in the French patent publication No. 2,019,774, does not lead to satisfactory properties. Thus, searches have been turned towards composite materials made of mixtures of a basic polymer and of a photochromic substance, in which however the photochromic substance is linked to the polymer by chemical bonds. In the known processes, these chemical linkages may be obtained either by the copolymerization of a basic monomer and a photochromic monomer, or by grafting at the ends of the chain of a polymer having active terminal groups.

These suggestions have however not led to the expected results. Particularly, the mechanical properties of these materials are still highly modified by the photochromic substance, with respect to the base polymer, and above all, the resistance to ageing of photochromism is not substantially improved. Due to the inadequacy of these two types of properties the materials thus obtained are practically deprived of any industrial interest and particularly any application to the manufacture of photochromic panes or protecting organic glass is prohibited. It should be recalled here that one intends by resistance to ageing the ability of the material to retain its photochromic properties when submitted to a continuous light for a long time.

An essential object of the present invention is to overcome the inconveniences of known techniques and to allow thereby to make use of the specific qualities of organic photochromic substances in the production of materials convenient for industrial uses, and more particularly in the production of transparent photochromic materials of organic type, exhibiting an optical density and a coloration and discoloration speed higher than those of mineral glass, and showing however good mechanical properties and a high resistance to ageing.

To this end, the invention makes use of copolymers having a particular organized structure, as may be found in block copolymers such as obtained by anionic processes. As a matter of fact, it is known that anionic polymerization leads to living polymers which, through successive polymerizations of two monomers or more, form block copolymers, in which the molecular weight and chemical nature of each of the blocks, or segments, are governed with precision, as well as their relative disposition, and which, thereby, may be produced under the form of predetermined regular structures.

According to one object of the invention, a photochromic material is essentially constituted by an organic photochromic substance regularly distributed in a transparent polymeric material comprising a base block copolymer the structure of which comprises blocks of a first polymer forming a dispersed phase in a matrix phase essentially formed by blocks of a second polymer.

The block copolymers which constitute the polymeric base of the materials of the invention may be obtained by methods already known per se.

According to the invention, the specific properties of the copolymers having such a dispersed phase type of structure are advantageously used to improve simultaneously the whole properties of the material and the operating process of the photochromic substance. The dispersed phase is very finely and regularly distributed in the block copolymers, which allows to ensure a similar fine and regular distribution of the photochromic substance in the material, as well as a long duration of the distribution stability. Furthermore, due to the fact that in the block copolymer the dispersed phase and the matrix are respectively constituted from two polymers of different species, the invention allows to take this into account, in order to, on one hand develop selective local retention of the photochromic substance on one of the phases, on the other hand to create locally, at that place where the photochromic substance is, an environment which is particularly well adapted to its good operation or effectiveness, depending from the respective own properties of the polymers.

Generally, the dispersed phase of the copolymers may be under the form of particles, especially spherules or rods, embedded in the phase of the matrix, or under the form of flakes intercalated between flakes formed of the blocks of the other polymer. It should be underlined that the general term of matrix must, in a general manner within the scope of the present invention, be understood according to a meaning sufficiently wide to encompass these various possibilities, even though the matrix does not always actually constitute a continuous phase, and including the last case in which the structure is rather of a laminated type. However, copolymers in which blocks of the first polymer form particles individually encased in a continuous matrix are preferred. Thus, the copolymers in which the dispersed phase is under the form of spherules or rods, and more preferably spherules, are preferred. This implies generally that the polymers involved in the constitution of the block copolymer be in quite different proportions, the smallest proportion being that of the dispersed phase blocks. The proportion of each polymer in the copolymer may usually vary through the whole range from 1 to 99% by weight. The proportion of the polymer of the so-called dispersed phase is generally from 1 to 60% by weight with respect to the total weight of the copolymer, or preferably from 5 to 25% by weight.

Whereas in the copolymers constituting the base polymeric material in the material according to the invention, the two phases distinguish from each other by the different nature of the polymer blocks which control their formation, nevertheless these blocks may not be their sole constituent. Contrarily, it is for example more often advantageous that either one or both of the phases contain solvents, plasticizers, and other varied additives conventionally used in combination with polymers; such additives then distribute between the phases of the block copolymer according to their compatibility with the respective units and according to the way they are introduced in the material. Besides, it must be understood that the term of polymer used to designate each type of blocks in the block copolymer, includes as well copolymers, i.e., that either one or both types of blocks can be composed of a copolymer as well as of an homopolymer, and they may even be made of mixtures of polymers or blends.

In the material according to the invention, it is advantageous that the photochromic substance be locally retained in the area of one of the phases of the copolymer, and preferably selectively in the dispersed phase or in the close vicinity of the latter.

A selective retention of the photochromic substance may be obtained for example due to the relative physico-chemical properties of the two phases with respect to the photochromic substance. This is particularly the case when the phase of the matrix, as per the nature of the corresponding polymer or that of an additive that the said phase contains, exerts a repulsive action on the photochromic substance, or when the latter is selectively compatible with the polymer of the dispersed phase or is soluble in a selective solvent or plasticizer for this polymer, which is therefore itself locally retained in the area of the dispersed phase. Reversely, and by similar means, the photochromic substance may be locally retained in the area of the units of the matrix.

A selective fixation of the photochromic substance at the level of one of the phases may as well, and preferably, be effected by a chemical linking of the molecule of this substance with a selective component of this phase, particularly with the corresponding polymer blocks. As in the other embodiments of the invention, this chemical linking occurs preferably between the photochromic substance and the polymer blocks of the dispersed phase. Possibly, a complementary chemical linkage may simultaneously link the photochromic substance to the polymer blocks which constitute the matrix, so that this substance is thus retained, not in the very core of the dispersed phase, but at the interface between the latter and the matrix.

Of course, the various alternative embodiments considered above are not limitative and, further, they may be combined with one another. But in all cases, it is particularly advantageous that the photochromic substance be in that phase which presents the lowest viscosity, due for example to an elastomeric nature of the corresponding blocks, or due to the presence of a solvent or a plasticizer. A low viscosity of the phase which contains the photochromic substance involves a good operating effectiveness of the latter, without too much reducing the properties of the material as a whole, since these properties are still controlled for a large part by the inherent properties of the other phase. Most often, the properties of the material are mainly dependent upon those of the phase constituting the matrix. Then, a material in which the blocks of the matrix derive from a polymer having a high rigidity, also shows a high mechanical resistance, while, contrarily, an elastomer leads to a material which is more convenient for the production of flexible films.

The base polymeric material of the material according to the invention must of course be sufficiently transparent to allow the operating effectiveness of the photochromic substance which is dispersed therein. However, generally, this transparency is easily obtainable, be it only due to the specific structure of the copolymers used, and more precisely to the fine regular distribution of the phases. It is however preferred that the two phases have refractive indices of close values, here again either due to the nature of the polymer blocks themselves, or due to the presence of an additive selectively modifying the refractive index of one of the block types. These conditions are easily met because the dispersed-phase structures of block copolymers may comprise very diverse blocks, particularly all kinds of blocks derived from polydienic, polyacrylic or polymethacrylic, or polystyrenic polymers. Furthermore, copolymers comprising particles of small sizes dispersed in a transparent matrix are preferred, which allows to maintain transparency through the material as a whole even when the two phases have quite different refractive indices. From this point of view, the particle size of the dispersed phase, which may be considered for example by terms of the diameter of the spherules, the length of the rods, or the thickness of the flakes, are preferably lower than 5000 angströms, and more preferably within the range from 50 to 300 angströms.

According to the invention, the block copolymer can be advantageously prepared through at least two successive polymerization stages, each using an anionic process, from at least two different monomers. Depending on the polymerization initiator, a block bi- or tri-polymer is obtained. Preferably, the polymerization stages are conducted in such a manner as to obtain, for each of the blocks, molecular weights between 2000 and 50000.

The structure of the copolymer depends upon the relative proportions of the different blocks, according to laws which are known per se and which are stated, among others, by G. E. MOLAU, in "Block Polymers" (S. L. AGGARWAL Ed., Plenum Press, New York, 1970, p. 79), or by A. KELLER in J. Polym. Sci., Polym. Phys., 14, 833 (1976). Thus, for example, the structure of a block styrene and butadiene bi-polymer is composed of : spheres of polystyrene in a matrix of polybutadiene for from 1 to 15% by weight of styrene with respect to the total weight of this monomer; cylinders of polystyrene in a matrix of polybutadiene for from 15 to 40% of styrene; a laminated structure for from 40 to 60% of styrene; cylinders of polybutadiene in a styrenic matrix for from 60 to 85% of styrene; spheres of polybutadiene in a styrenic matrix for from 85 to 99% of styrene. The same series of structures are found also in the case of block terpolymers, with proportion ranges however different.

In one of the embodiments of the invention, the monomer(s) which, being in more important proportion, are to form the blocks of the matrix, are preferably selected so as to lead to a transparent polymer with good mechanical rigidity which, preferably, must be resistant to abrasion, oxygen-tight, and highly transmissive for the radiation that activates the photochromic substance, i.e., in particular for ultra-violet radiations. Such blocks, which are particularly convenient for composing the matrix of the photochromic material according to the invention, may more specifically be of the type of polyacrylic, or polymethacrylic derivatives, or polystyrenic derivatives. A dispersed phase, in particular under the form of spherules or rods in such a matrix, is then preferably composed of blocks which are contrarily of an elastomeric type, or at least have a lower rigidity than the blocks of the matrix. Preferred polymers for this dispersed phase are the polydien derivatives or the polyacrylic or polymethacrylic derivatives, or any polymer the vitreous transition temperature of which may be lowered by adding there to a plasticizer or a solvent. In other embodiments, the elastomers are also used for the matrix. This alternative can be used in particular in the case of laminated structures and leads to a material which be easily shaped into flexible films.

Furthermore, as already indicated, the kind of the polymers involved in the composition of the photochromic material is selected, in intimate relationship with the kind of photochromic substance, in order to promote the selective fixing or retention of said substance in the area of the blocks of one of the phases, either by a physical phenomenon, or preferably by chemical linking with the corresponding blocks, as it will become apparent from the various particular embodiments of the method according to the invention, which will be more specifically described hereinafter.

Generally speaking, any photochromic substance may be used in the practice of the invention. Organic photochromic substances may preferably be selected from all those which belong to the species of spiropyrans or to the species of triphenylmethane. The preferred substances are those the molecule of which contains at least one electrophilous group capable of being fixed at a chain end of a living polymer, or one group allowing its grafting on a complementary group borne by the blocks of the copolymer.

In one embodiment of the method according to the invention, the block copolymer is prepared by successive polymerizations of two monomers, the second monomer being introduced in the living polymer which results from the polymerization of a first monomer, the living copolymer is possibly inactivated at the end of the polymerization, then it is admixed with a photochromic substance which is soluble in the blocks forming the spherules, rods, flakes or other particles of the dispersed phase, but insoluble in the blocks forming the matrix.

In another embodiment, addition of the photochromic substance is effected in the same way, but by means of a preferential solvent or plasticizer for the blocks of the dispersed phase, in which it is previously dissolved and which then carries the photochromic substance down to the particles through the matrix.

The above embodiments, which do not ensure by themselves the chemical linking between the polymer and the photochromic substance, may advantageously be combined with the embodiments which involve such a chemical linking, in order to promote a selective fixing on the blocks constituting the dispersed phase.

In order to obtain a chemical linking, termination of a still living chain of a block copolymer may for instance be accomplished using a photochromic compound comprising an appropriate substituent, i.e. an electrophilous substituent, and preferably an electrophilous substituent selected from vinyl radical and halogenated alkyl radicals (wherein the halogen may preferably be chlorine or iodine and the alkyl radical may preferably comprise from 1 to 5 carbon atoms) which is attached to the molecule of the photochromic compound.

One may also, provided the chain of the copolymer is previously terminated by means of reactive groups such as —OH, —NH$_2$, —Cl or similar groups, add to the composition a photochromic compound the molecule of which carries a function which reacts with the reactive group and thus ensures its grafting at the end of the copolymer chain.

One may furthermore react lateral functional groups borne by the polymer blocks with complementary groups introduced as substituents in the molecule of the photochromic compound.

In other embodiments, the photochromic substance may be added during the preparation of the copolymer, prior to the polymerization of the second-introduced monomer, or even prior to the polymerization of the first monomer. One may, for example, use a photochromic compound having an ethylenic double bond and produce from it a copolymer with the polymer of the dispersed phase.

In an alternative embodiment, the use of a photochromic compound the molecule of which comprises two functional substituents, of one same type or of different types, allows to perform linking of said photochromic compound with the polymer of the dispersed phase as well as with the polymer of the matrix.

Preferential introduction of appropriate additives in one phase of the copolymer or the other may be effected during the preparation of the copolymer, by admixing them together with the monomers, or subsequently.

For example, such alternatives apply to the incorporation of a selective plasticizer for the blocks on which the photochromic substance is to be retained. Such a plasticizer may further be used to control the photochromism kinetics. It is known, in fact, that the discoloration speed of photochromic derivatives of compounds such as spiropyrans, depends in wide limits upon the viscosity of the environmental medium in which they are placed. The viscosity has already favourable values in the preferred case when the photochromic substance is fixed on a dispersed phase composed of spherules or rods of blocks of an elastomer encased inside a matrix which is composed of blocks of a rigid polymer. But, furthermore, the viscosity may be decreased by the addition of a plasticizer. Addition of a plasticizer may further allow to adjust the dielectric constant of the spherules, while the coloration and the reaction speed of numerous photochromic substance depend from said dielectric constant. Other additive may be selectively admixed to the spherules, or possibly be carried down to the spherules by a selective plasticizer in the presence of the matrix. Among such possible additives are the agents capable of inhibiting degradation of the photochromic substance.

The plasticizer may possibly be constituted, in fact, by a solvent such as an alcohol, for example ethanol, or such as water, in connection with an impermeable matrix and an hydrophilous dispersed phase. This is particularly advantageous in the case of photochromic substances derived from triphenylmethane, which are effective in an aqueous or alcoholic medium. Preferential absorption of the solvent by the dispersed phase ensures a good distribution of the photochromic activity in the material, and a relative impermeability of the matrix prevents diffusion of the reaction compounds and thereby ensures perenniality of the activity.

On the other hand, it must be pointed out that the general terms of photochromic substance, or photochromic compound, must be understood in a large meaning, as designating as well, for example, mixtures or precursors of photochromic derivatives. Likewise, a specific substance may be introduced in the material under either its coloured or not coloured form. In the particular case when the photochromic process involves a reaction between two separate molecules, the structure of the block copolymer may be turned to account by fixing respectively each of the molecules on each of the types of blocks in the material, so as to make the reaction take place at the interface between the dispersed phase and the matrix.

The amount of photochromic substance may be any photochromically effective proportion. Usually proportions from 0.1 to 10% by weight of the polymer material are preferred. More generally the amount of photochromic substance corresponds to the optimum amount which can be chemically attached to a selected phase of the polymer material or otherwise retained in or close to said phase, which depends for instance from the stoichiometric reaction with reactive chain-ends of the copolymer blocks or from the amount which can be physically absorbed by or impregnated into the material.

Shaping of the materials according to the invention is performed along with any technique known in the industry of plastics. These materials may particularly be moulded from the mass or be applied as films on substrates, their hardening being then obtained by solvent evaporation. They may possibly be used in the manufacture of composite products, wherein they form a plastic layer between transparent glass layers.

The invention will be now described with more details in specific examples, which are not limitative. In these examples, the proportions of the products used are expressed by terms of weight, except when otherwise stated.

EXAMPLE I

In this example, the polymeric base of the material is a polystyrene-polyisoprene block copolymer prepared in such a manner that the polyisoprene forms an elastomeric phase under the form of spherules the diameter of which is in the range of 200 angströms, dispersed inside a continuous matrix of rigid polystyrene.

A living polystyrene is first prepared by polymerization of 380 g of styrene at $-70°$ C in 7.5 l tetrahydrofuran, the polymerization being initiated by 2.53 cm$^3$ of butyl-lithium at a concentration of 20% in hexane. After a few minutes, consumption of the monomer is completed. Then 51 g of isoprene are added, still at a low temperature ($-70°$ C), in order to form a polystyrene-polyisoprene linear block copolymer in which the chain lengths of the blocks correspond to a molecular weight of 60000 for polystyrene and 8000 for polyisoprene.

After 3 hours polymerization, the growth reaction of the isoprene blocks being completed, the solution is maintained at a low temperature, while a spiropyran is added, onto which the living copolymer desactivates. The spiropyran used is one which is substituted by an iodobutylradical on the nitrogen atom, and more particularly dimethyl-3,3(iodo-4" butyl)-1 indoline 2-spiro-2" nitro-6' benzo(b) pyran. The amount of spiropyran is 5.6 g which substantially corresponds to twice the stoichiometric amount with respect to the reactive ends in the anionic reaction.

The polymer is collected by precipitation from methanol. It is thereafter filtered and vacuum dried. The powder thus obtained is dissolved in benzene in order to produce a 5% solution which is applied on a substrate to form a film by evaporation of the solvent.

The film thus obtained is optically transparent and photochromic at room temperature. When in the activated state, due to an exposure to ultra-violet rays, it takes a blue colouration.

EXAMPLE II

The procedure described in example I is repeated, except for replacing in iodobutyl spiropyran by an homolog compound substituted on the phenyl radical by a chloromethyl radical, that is trimethyl-1,3,3 indoline 2-spiro-2' nitro-6' chloromethyl-8' benzo (b) pyran.

The material obtained shows in the activated state a colour more purple than the preceding one, and, in the natural state, it has a very light pink colour.

EXAMPLE III

The polymerization of methyl methacrylate is effected by the anionic process in tetrahydrofuran at a low temperature ($-70°$ C) in the presence of an initiator constituted by diphenyl (1–1)hexyl-lithium. 300 g of methyl methacrylate are used in 4 liters of tetrahydrofuran and 6 millimoles of the initiator. 27 g of hexyl methacrylate are copolymerized on the living polymethyl methacrylate, in order to eventually form the elastomeric phase. At the end of the polymerization, deactivation of the living copolymer is ensured as in example I, using a photochromic compound : i.e., the 8'-chloromethyl or N-iodobutyl derivatives of spiropyran of examples I and II respectively.

EXAMPLE IV

In this example, the copolymer is a block terpolymer of polymethyl methacrylate (rigid phase) and polyhexyl methacrylate (elastomeric phase).

60 g of polyhexyl methacrylate are prepared by anionic polymerization of hexyl methacrylate at $-55°$ C in 1 liter of pure tetrahydrofuran. Polymerization is promoted by bifunctional naphthalene-sodium, itself prepared from 1.53 g naphthalene and 0.30 g sodium. 50 g of methyl methacrylate monomer are added to the polymer thus obtained. The mixture is left to polymerize for 1 hour and thereafter poured on 6 g of a photochromic derivative constituted by the same iodobutyl spiropyran as in example I.

A block terpolymer is obtained which is composed of polymethylmethacrylate, polyhexylmethacrylate, polymethylmethacrylate, and in which the lengths of the blocks correspond to respective molecular weights of 5000, 10000, 5000.

The copolymer is photochromic when it is used in solution in aromatic derivatives such as benzene or when it is shaped into films. These are flexible films.

EXAMPLE V

A copolymer comprising 80% by weight polystyrene and 20% by weight polyethylene oxide is obtained by the anionic process effected in tetrahydrofuran in the presence of diphenylmethyl-potassium. The lengths of the blocks correspond to a molecular weight of 40000 for the polystyrene and 10000 for the polyethylene oxide. The block copolymer obtained is formed of a polyoxyethylene phase under the form of rods dispersed in the rigid polystyrene.

The copolymer is shaped into a film of 0.5 mm thickness, from a solution in toluene from which the solvent is evaporated. Then, this film is immersed in an aqueous solution containing bis(dimethylamino)-4,4' triphenylmethanol (derivative of Malachite green) at a concentration of 0.02 mole/l, that is 7 g/l, and sodium hydroxide at a concentration of 0.4 g/l.

The film obtained is photochromic. It becomes green coloured when irradiated under proximal ultra-violet rays.

EXAMPLE VI

The same operating process as in example V is performed, except that in the aqueous solution used to impregnate the film, the photochromic derivative is bis(dimethylamino)-4,4' triphenyl ethane-nitrile and the sodium hydroxide is replaced by potassium cyanide.

Obviously, the present invention is not limited to the particular operating conditions hereinabove described in the course of the preceding examples.

The formulae of the various photochromic compounds used in the examples are given below :
Dimethyl-3,3(iodo-4" butyl)-1 indoline 2-spiro-2' nitro-6' benzo(b)pyran (Example I) :

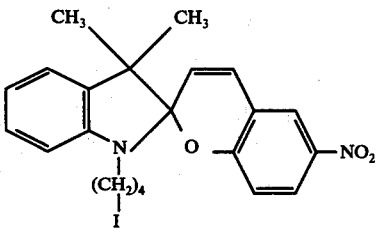

Trimethyl-1,3,3 indoline-2-spiro-2' nitro-6' chloromethyl-8' benzo(b)pyran (Example II) :

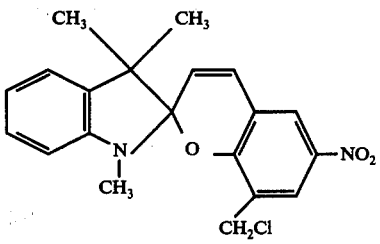

Bis(dimethylamino)-4,4' triphenylmethanol (Example V) :

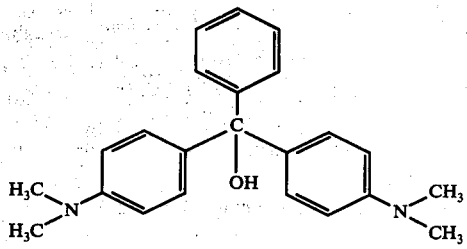

Bis(dimethylamino)-4,4' triphenylethane-nitrile (Example VI) :

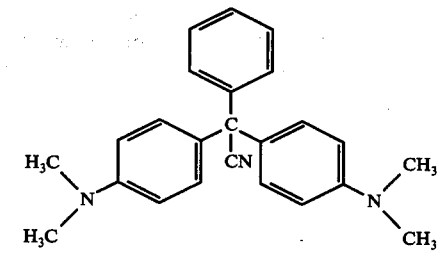

What I claim is:

1. A photochromic material comprising a transparent polymer material having a block copolymer base with a structure wherein blocks of a first polymer form a dispersed phase in a matrix phase essentially composed of blocks of a second polymer, and an organic photochromic substance being uniformly distributed in said polymer material and being selectively retained in the area of one of said phases.

2. A photochromic material according to claim 1, wherein said photochromic substance is selectively retained in the area of the one of said phases having the lowest viscosity.

3. A photochromic material according to claim 1, wherein said photochromic substance is physically or chemically retained in said dispersed phase or in the immediate vicinity thereof.

4. A photochromic material according to claim 3, wherein the dispersed phase is in the form of spherules, rods or flakes, in a continuous matrix phase.

5. A photochromic material according to claim 1, wherein the dispersed phase is in the form of flakes in a matrix phase in which said second polymer is an elastomer.

6. A photochromic material according to claim 1, wherein the particles of said dispersed phase have a size below 5000 angströms and are dispersed within a transparent matrix phase.

7. A photochromic material according to claim 6, wherein said size of the particles is from 50 to 300 angströms.

8. A photochromic material according to claim 1, wherein said first polymer is an elastomer and said second one is a rigid polymer.

9. A photochromic material according to claim 1, wherein the photochromic substance is selectively compatible with the polymer in said one phase in the presence of the other.

10. A photochromic material according to claim 1, wherein the photochromic substance is soluble in a selective solvent or plasticizer for the polymer in said one phase.

11. A photochromic material according to claim 10, wherein said one phase further contains a solvent or a plasticizer for the copolymer blocks in said one phase.

12. A photochromic material according to claim 1, wherein said photochromic substance is chemically linked at least to the blocks of the first polymer.

13. A method for preparing a photochromic material, comprising preparing a block copolymer in which blocks of a first polymer constitute a dispersed phase in a matrix phase essentially formed of blocks of a second polymer, and selectively fixing a photochromic substance in the area of the blocks of one phase of said block copolymer.

14. A method according to claim 13, wherein the copolymer is prepared by successive polymerization of at least two different monomers by an anionic living polymerization process.

15. A method as claimed in claim 13, comprising adding to said block copolymer a photochromic substance which is selectively soluble in the polymer blocks in the dispersed phase.

16. A method as claimed in claim 13, comprising contacting said block copolymer with a photochromic substance dissolved in a selective solvent or plasticizer for said first polymer.

17. A method as claimed in claim 13, comprising terminating a living chain of said block copolymer with a photochromic compound having an electrophilous group on its molecule.

18. A method as claimed in claim 13, comprising terminating said block copolymer with reactive end groups for said photochromic substance, the reacting said photochromic substance with said end groups.

* * * * *